June 3, 1947.        M. D. GLASS ET AL        2,421,494
LEVER CONTROL UNIT
Filed May 24, 1943
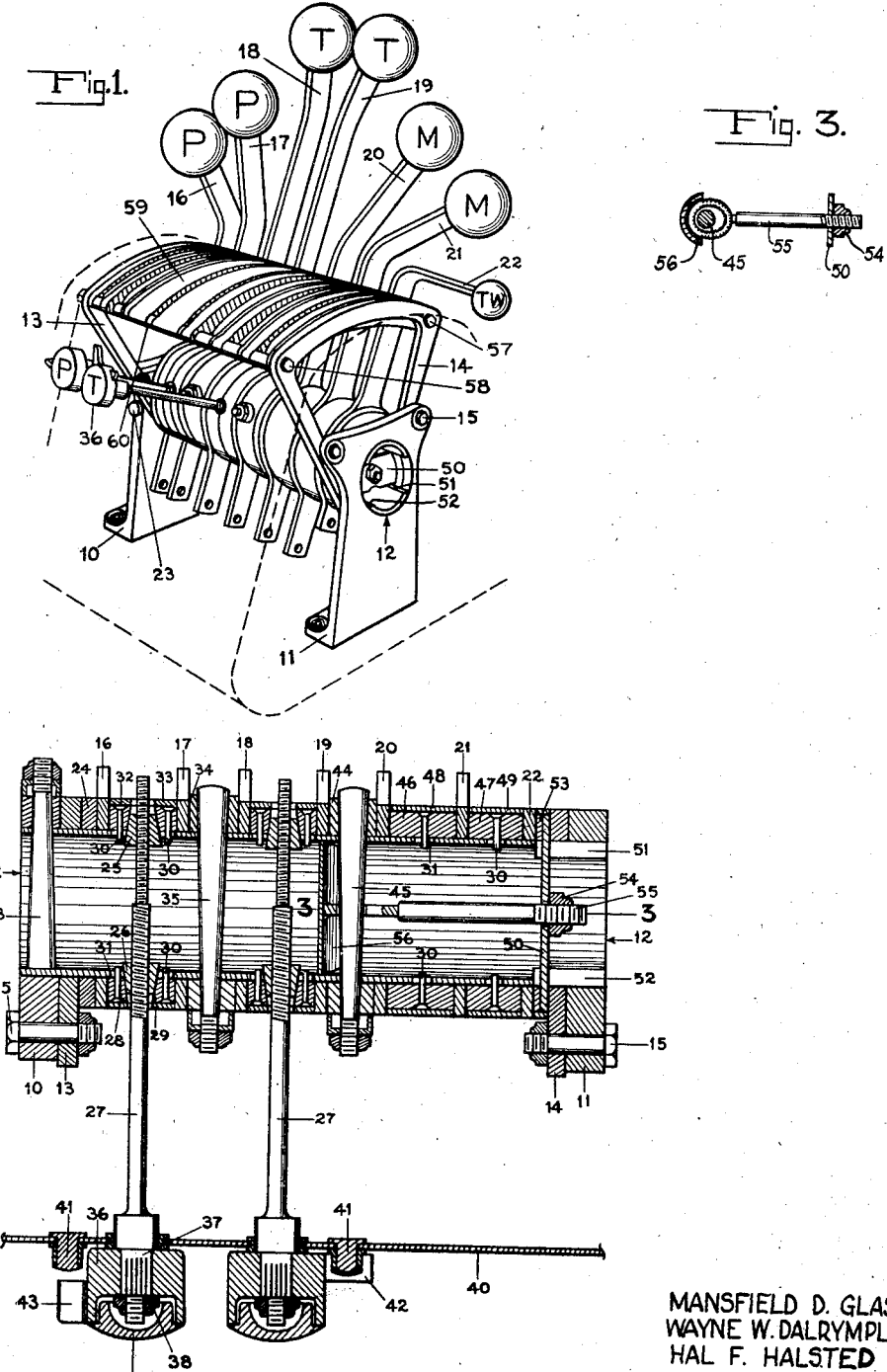
MANSFIELD D. GLASS
WAYNE W. DALRYMPLE
HAL F. HALSTED
INVENTORS
BY Reynolds & Beach
ATTORNEYS Patented June 3, 1947

2,421,494

UNITED STATES PATENT OFFICE 2,421,494

LEVER CONTROL UNIT

Mansfield D. Glass and Wayne W. Dalrymple, Wichita, Kans., and Hal F. Halsted, Ferndale, Mich., assignors to Boeing Airplane Company, Wichita Division, Wichita, Kans., a corporation of Delaware Application May 24, 1943, Serial No. 488,138

13 Claims. (Cl. 74—531)

This invention relates to an improvement in control units, and particularly to a control unit adapted for use in an airplane for moving and controlling different types of mechanisms with which the airplane is equipped.

One embodiment of the invention may, for instance, be used in a two-motored airplane to control separately the adjustability of the engine throttles, of the pitch regulators for the propellers, and, conjointly, of the controls for the fuel-air mixture for the carburetors and the tail wheel lock operator.

The advantages of providing for a compact grouping of such control levers are well recognized in the art, and their enumeration is unnecessary. The chief difficulty in the past has been in providing a friction adjustment for any selected group or groups of control levers without simultaneously changing the friction adjustment on all other associated control levers. It has been common practice to mount the several pairs or sets of control levers on different shafts, which of course required a much larger control unit, or several smaller control units. Both of these expedients are less desirable than a single compact control unit.

It is the chief object of this invention, therefore, to provide a small compact control unit in which all control levers are mounted on a single shaft in groups of related levers, and which enables selective adjustment of the friction on each pair or group of control levers to be made without variation in the friction adjustment on the levers in any other group.

Another object of the invention is to provide a control unit which permits locking all the control levers in any selected group without immobilizing any other lever mounted on the same shaft, and which locking action can be accomplished quickly and easily.

It is also an object of the invention to provide a control unit of this type which is so constructed that the wear on its various parts may be compensated for easily and quickly, simply by a relative adjustment of certain of its parts.

Another object of the invention is to provide a control unit of this type which is so constructed as to permit a desired minimum frictional pressure to be placed on the control levers of any selected group, with an adjustment for resetting the desired minimum friction as wear of the various parts changes the amount of friction created in the original setting.

The details in the construction of a preferred form of unit, which is illustrative of our invention, together with other objects attending its production, will be understood from the following detailed description when read in connection with the accompanying drawings.

Figure 1 is a perspective view of the device with its casing indicated in phantom, all the control levers being shown at one end of their respective paths of travel.

Figure 2 is a generally horizontal sectional view through the unit, the various control levers being shown at the opposite ends of their respective paths of travel.

Figure 3 is a fragmentary sectional view taken along the line 3—3 of Figure 2.

The unit illustrated incorporates two propeller pitch control levers, having knots labelel P, constituting one group, two engine throttle levers T forming a second group, and a third group including two levers M to regulate the fuel-air mixture for the carburetors and the lever TW to operate the tail wheel lock. Such unit is adapted to be attached to any suitable part of the airplane which will locate it conveniently for the pilot. Its frame consists of two end brackets 10 and 11 apertured to receive and support the opposite ends of a one-piece hollow shaft 12. Guide supporting quadrants 13 and 14 project upward from and are suitably secured to the brackets 10 and 12, such as by bolts 15. The lower ends of these quadrants may pass beneath, and assist the bracket apertures to support, the opposite ends of the shaft 12. The upper ends of the two quadrants are interconnected by bolts 57 and 58, which are threaded through apertures in the respective opposite ends of arcuate guide bars 59. Adjacent bars are spaced apart sufficiently to accommodate a control lever between them in each case by spacer sleeves 60 of proper length also mounted on such bolts between the ends of the guide bars. The guide bars thus defining the paths of travel for the upper ends of the various control levers may have serrated side faces to impede inadvertent shifting of the levers.

In Figure 1 it will be seen that all of the control levers, designated by the numerals 16 to 22, inclusive, include bearing collars near their lower ends journalled upon the fixed shaft 12 for oscillation. The lower ends of the control levers, projecting downward from such collars, form arms for connection to their respective control cables or rods. Referring now to Figure 2, a taper pin 23 received within the end of tubular shaft 12 projects radially through its wall and bracket 10, thus interconnecting these parts to prevent both rotative and axial movement of the shaft. A spacer ring 24 encircles the fixed shaft 12 to separate the lever 16 from the quadrant support 13.

Between the levers 16 and 17, whose knobs are lettered P to indicate that they are the two propeller pitch control handles, is arranged a preferred form of friction adjusting means operable to vary simultaneously and to the same extent the frictional forces resisting movement of such levers. Such friction adjusting arrangement consists of wedge blocks 25 and 26 which are threaded on a friction regulating rod 27. These blocks are threaded oppositely so that they will be moved apart when the rod is turned in one direction and toward each other when the rod is rotated in the opposite direction. These wedges and their control rod are interposed between the edges of a pair of friction rings 28 and 29 encircling shaft 12, the outer surfaces of which bear respectively against the bearing collars of levers 16 and 17, and the inner surfaces of which are tapered complementally to the wedges, as clearly shown in the drawing. These friction rings are axially slidable on the shaft 12, but are held against rotation thereon by pins 30 which pass radially through the rings and project into axially extending slots 31 in the wall of the hollow shaft 12. These pins are held against radial outward movement by thin bands 32 and 33, which respectively encircle the friction rings 28 and 29.

A relatively heavy separator collar 34 is held against both rotative and axial movement on the shaft 12 by a taper pin 35, which passes diametrically completely through both. This collar serves as a friction abutment for the outer surface of the bearing collar of the lever 17, as well as that of the lever 18.

A knob 36 for rotating a friction regulating rod 27 is adjustably but non-rotatably secured on the outer end of each such rod such as by a splined or serrated joint 37, and a nut 38, the nut preferably being covered by a suitable plug 39. The length of the friction adjusting rods is preferably such that their outer ends extend through and are journalled in the casing wall 40, the knobs 36 being positioned immediately adjacent the exterior of such wall. A stop pin 41, mounted in the casing wall, cooperates with each lug 42 projecting radially from an adjusting knob 36 to limit the rotation of each knob and its rod in a friction reducing direction. Each knob may also be provided with a thumb lever 43, if desired, which lever facilitates rotation of the knob to increase the friction for locking all the control levers in the group which such knob affects.

By turning the knob in the counterclockwise direction the wedges 25 and 26 are forced apart, in turn pressing the friction rings 28 and 29 axially against the bearing collars of control levers 16 and 17, respectively, and increasing the friction between both lateral faces of each lever bearing collar and the rings in contact with them. With a rotation of the knob 36 through less than a complete turn, this friction can be increased sufficiently to completely lock the control levers 16 and 17 so that they cannot be swung manually in either direction. Various desired degrees of friction can, of course, be obtained, and each setting will be maintained until it is changed by rotation of knob 36 to increase or decrease such friction.

An identical friction regulating means is provided for each pair or group of similar control levers, such as propeller pitch control levers, for example, on which it is desired to regulate the friction simultaneously but independently of all other groups. For instance, the taper pin 35 and its collar 34 absolutely prevent the thrust created by wedges 25 and 26, acting axially of shaft 12, from being transmitted to the throttle levers 18 and 19 when the friction on the levers 16 and 17 is increased for preventing their movement to change the pitch of the propellers. Similarly taper pin 45 and its collar 44, identical with pin 35 and collar 34, respectively, isolate levers 18 and 19 from any thrust axially of shaft 12 exerted to lock levers 20, 21 and 22. Thus shaft 12 may be divided from end to end into any number of separate control lever group zones by separator collars such as 34 and 44, each zone, and the friction control for it, being entirely independent of the others.

With such a construction, a desired normal friction on the propeller pitch control levers 16 and 17, for example, may be established by turning the rod 27 between them in a counterclockwise direction as far as possible by directly gripping its serrated or splined end with thumb and forefinger. The knob 36 labeled P is then placed on the rod in such relative position that its lug 42 contacts such side of the adjacent pin 41 as to prevent clockwise rotation of such knob. Thereafter, the friction on the levers cannot be reduced beyond that corresponding to this original setting. When wear of the various parts changes the desired normal friction on the control levers, it is only necessary to reset the knob on the adjusting rod.

While the drawing illustrates the structure described above for regulating the friction acting upon only two similar levers forming a group, it will be understood that such structure could be modified to accommodate an additional lever or levers on the shaft 12 either between the collar 34 and the ring 29 or between band 24 and ring 28, such as might be required for a four-motored airplane. In such event suitable spacer rings should be inserted between each pair of adjacent levers, each ring having pins such as 30 to prevent their rotation on shaft 12 without impeding their axial movement along it. Conversely, the frictional adjustment of a single lever only can be accomplished by use of the same mechanism. Thus, for example, lever 17 could be omitted so that ring 29 would bear directly upon separator collar 34. Operation of the knob 36 to force rings 28 and 29 apart would then increase the friction only upon lever 16. A similar arrangement could provide an individual friction adjustment for lever 17, if that were desired.

The construction illustrated assumes that frequent regulation of the friction on the control levers 20, 21, and 22 is not necessary, because of their function to control fuel-air mixture for the engine carburetors and the tail wheel lock, respectively, so a different type of friction regulating means is provided, although the type described above could be used, if desired. This type cannot be operated as quickly, and in the form shown cannot be operated manually, although such operation could be provided. Each of these three levers is separated from the adjacent lever or levers by spacer or friction rings 46 and 47, which rings are held against rotation on the tubular shaft 12 by radial pins 30 carried by the rings and projecting through axially directed slots 31 in the shaft wall. These pins are held in rings 46 and 47 by bands 48 and 49 encircling such rings, respectively.

Frictional regulation of control levers 20, 21 and 22 is accomplished by direct pressure exerted by a tension member rather than by utilization of a wedging action, namely, by movement of a follower plate 50 longitudinally of shaft 12. The ends of such plate are received in diametrically opposite axial slots 51 and 52, cut in the end of the hollow shaft 12 adjacent to such levers. The ends of this plate extending radially beyond the shaft bear against a spacer ring 53 which in turn presses against the bearing collar portion of the tail wheel locking lever 22. The plate is moved lengthwise of slots 51 and 52 toward separator collar 44 by rotation of a nut 54 threaded on an eyebolt 55 which projects through the plate. For manual operation this nut may be of the wing nut type. The eye of this bolt encircles the taper pin 45 and bears against its side remote from plate 50. A light plate 56 of arcuate cross section fitting loosely within tubular shaft 12 is secured to the head of this eyebolt, as by welding, to prevent its eye from slipping toward the small end of the taper pin 45 when the nut 54 is tightened. As plate 50 is drawn toward the separator collar 44 by screwing up nut 54 a direct, substantially equal frictional pressure is exerted on the bearing collars of all three of the levers 20, 21, and 22, which may be increased to the point where the levers cannot be moved, just as where the previously described type of friction control mechanism is used.

What we claim as our invention is:

1. In a control unit, a fixed shaft, a plurality of control levers journaled on said shaft, friction means operable to resist swinging of said control levers, regulating means movable to vary the resistance of said friction means to swinging of a selected one of said control levers without altering the resistance to swinging of other of said control levers, and limit means operable to restrain resistance-reducing movement of said regulating means beyond a position corresponding to a desired minimum resistance to swinging of such selected control lever.

2. In a control unit, a fixed shaft, a plurality of control levers journaled on said shaft, a separator collar secured on said shaft in a position interposed between two of said control levers to segregate said control levers into two groups, friction means operable to resist swinging of all the control levers in each group, regulating means operable to vary the resistance of said friction means to swinging of all the control levers in a selected one of such groups without altering the resistance to swinging of the control levers in the other group, and limit means operable to restrain resistance-reducing movement of said regulating means beyond a position corresponding to a desired minimum resistance to swinging of the levers in such selected group.

3. In a control unit, a fixed shaft, a plurality of control levers journaled on said shaft, two separator collars secured on said shaft in spaced relationship and dividing one group of said control levers between said collars from other groups of said control levers one at the side of each separator collar remote from the other separator collar, friction means operable to resist swinging of all the levers in each group, independent regulators one for each group of said control levers, each regulator being operable to vary the resistance of said friction means to swinging of all the control levers in its group without altering the resistance to swinging of the control levers in any other group, and limit means for each regulator operable to restrain resistance-reducing movement thereof beyond a position corresponding to a desired minimum resistance to movement of the control levers in its group.

4. In a control unit, a fixed shaft, a plurality of control levers journaled on said shaft, friction means engageable with said levers to resist swinging thereof, and wedging means movable generally radially of said shaft to force said friction means lengthwise of said shaft against said control levers for increasing simultaneously the resistance to swinging thereof.

5. In a control unit, a fixed shaft, two control levers journaled on said shaft, a pair of friction rings on said shaft interposed between and engaged respectively with said two control levers, tapered wedges interposed between and engaged with said friction rings and movable generally radially of said shaft to force said rings apart axially of said shaft to press each ring against the control lever engaged thereby for increasing simultaneously the resistance to swinging of each control lever relative to the friction ring engaged therewith.

6. In a control unit, a fixed shaft, a control lever journaled on said shaft, a friction ring on said shaft engageable with said control lever, means restraining rotative movement of said friction ring relative to said shaft, and wedging means engageable with said friction ring and movable generally radially of said shaft to press it lengthwise of said shaft against said control lever to increase the resistance to swinging of said control lever upon said shaft.

7. In a control unit, a fixed shaft, a plurality of control levers journaled on said shaft, a separator collar secured on said shaft and dividing said control levers into two groups, each containing at least two control levers, two pairs of friction rings on said shaft, one pair for each such group of control levers, and each pair of friction rings being interposed between and engaged respectively with two control levers of its group, means interposed between the friction rings of each pair and operable to move said rings apart axially of said shaft to press each ring against the control lever engaged thereby, and independent regulators, one for each pair of friction rings and operable to shift the rings of its pair for varying the resistance to swinging of the control levers engaged thereby without altering the resistance to swinging of the control levers in the other group.

8. In a control unit, a fixed shaft, two control levers journaled on said shaft, a pair of friction rings on said shaft interposed between and engaged respectively with said two control levers, means interengaged between each of said friction rings and said shaft guiding said rings for axial non-rotative movement relative to said shaft, diametrically opposed wedge blocks received between the friction rings of said pair, and regulating means interconnecting said wedge blocks and operable to move them simultaneously radially inward to force said rings apart axially of said shaft, thus to press each ring against the control lever engaged thereby for increasing simultaneously the resistance to swinging of each control lever relative to the friction ring engaged therewith and said shaft.

9. In a control unit, a fixed shaft, two control members journaled on said shaft, a collar separating said control levers, a tapered pin extending generally radially of said shaft through apertures in said collar and said shaft, and means operable to move said tapered pin lengthwise to seat firmly in such collar and shaft apertures to fix said collar on said shaft against movement relative thereto both circumferentially and lengthwise thereof.

10. In a control unit, a fixed shaft, a plurality of control levers all mounted on said shaft and swingable about the axis thereof when in assembled relationship, friction means operable to resist swinging of said control levers, a plurality of regulating means corresponding, respectively, to different ones of said control levers and movable to vary the resistance of said friction means to swinging of a selected one of said control levers without altering the resistance to swinging of other of said control levers, and a plurality of means intermediate the ends of said shaft, each corresponding to a different one of said regulating means and extending transversely of said shaft, thereby being accessible for manipulation when said control levers are in assembled relationship, and operable each to actuate only its corresponding one of said regulating means individually and independently of the other regulating means, thus to vary the resistance of said friction means to swinging of a lever corresponding to such regulating means without actuating another of said regulating means.

11. In a control unit, a fixed shaft, a plurality of control levers all mounted on said shaft and swingable about the axis thereof when in assembled relationship, means segregating said control levers into a plurality of groups each including a plurality of levers, a plurality of holding means, each holding means being interposed between adjacent control levers of a single group and movable to resist swinging of all the control levers of that one of such groups without altering the resistance to swinging of the control levers in other of said groups, and releasable to remove such resistance to swinging of the control levers in its respective group, and means accessible for manipulation when said control levers are in assembled relationship, and operable to actuate different ones of said holding means individually and independently of the other holding means thus to effect resistance to swinging of the control levers separately in any such group.

12. In a control unit, a fixed shaft, a plurality of control levers all mounted on said shaft and swingable about the axis thereof when in assembled relationship, two separator collars secured on said shaft in spaced relationship and dividing one group including a plurality of said control levers between said collars from others of said control levers, at least one such lever being at the side of each separator collar remote from the other separator collar, friction means operable to resist swinging of all the levers in said group between said collars, and a regulator accessible for manipulation when said control levers are in assembled relationship, operable to vary the resistance of said friction means to swinging of all the control levers in said group between said collars without altering the resistance to swinging of any of the other control levers.

13. In a control unit, a fixed tube, a control member journaled on said tube, a friction ring engageable with said member to resist swinging thereof, a screw member extending substantially diametrically of said tube and having portions adjacent to opposite sides thereof threaded in opposite directions, and wedging members threaded on the oppositely threaded portions of said screw member, movable generally radially of said shaft in opposite directions by rotation of said screw, and engageable with said friction ring to move the same lengthwise of said shaft against said control member for increasing the resistance to swinging thereof.

MANSFIELD D. GLASS.
WAYNE W. DALRYMPLE.
HAL F. HALSTED.

REFERENCES CITED

The following references are of record in the file of this patent:

UNITED STATES PATENTS

| Number | Name | Date |
|---|---|---|
| 1,845,505 | Lockyear | Feb. 16, 1932 |
| 2,016,359 | Corbin, Jr. | Oct. 8, 1935 |
| 2,081,076 | Walker, et al. | May 18, 1937 |
| 1,813,532 | Dufaux | July 7, 1931 |
| 1,994,651 | Kingston | Mar. 19, 1935 |
| 2,274,288 | Arens | Feb. 24, 1942 |
| 1,583,962 | Denyes | May 11, 1926 |
| 1,670,848 | Denyes | May 22, 1928 |
| 1,687,567 | Johnson | Oct. 16, 1928 |
| 1,454,505 | Christen | May 8, 1923 |
| 1,793,786 | Emmons, 3d | Feb. 24, 1931 |
| 2,213,340 | Ellars | Sept. 3, 1940 |

FOREIGN PATENTS

| Number | Country | Date |
|---|---|---|
| 496,153 | Great Britain | Nov. 25, 1938 |
| 752,272 | France | Oct. 14, 1933 |
| 115,201 | Great Britain | May 2, 1918 |
| 235,989 | Great Britain | July 2, 1925 |
| 276,082 | Great Britain | Aug. 22, 1927 |
| 278,403 | Great Britain | Oct. 3, 1927 |